(12) United States Patent
Cheng et al.

(10) Patent No.: US 10,917,628 B2
(45) Date of Patent: Feb. 9, 2021

(54) IR PATTERN CHARACTERISTICS FOR ACTIVE STEREO MATCHING

(71) Applicant: MediaTek Inc., Hsinchu (TW)

(72) Inventors: Chao-Chung Cheng, Hsinchu (TW); Yu-Ying Wang, Hsinchu (TW); Chen-Hao Wei, Hsinchu (TW); Cheng-Ming Chen, Hsinchu (TW); Liang-Chun Lin, Hsinchu (TW)

(73) Assignee: MediaTek Inc.

( * ) Notice: Subject to any disclaimer, the term of this patent is extended or adjusted under 35 U.S.C. 154(b) by 79 days.

(21) Appl. No.: 16/359,699

(22) Filed: Mar. 20, 2019

(65) Prior Publication Data

US 2019/0303704 A1 Oct. 3, 2019

Related U.S. Application Data

(60) Provisional application No. 62/651,330, filed on Apr. 2, 2018, provisional application No. 62/651,813, filed on Apr. 3, 2018.

(51) Int. Cl.

| H04N 13/20 | (2018.01) |
| H04N 13/271 | (2018.01) |
| G06T 7/593 | (2017.01) |
| G06T 7/521 | (2017.01) |
| H04N 13/239 | (2018.01) |
| G06K 9/46 | (2006.01) |
| H04N 5/33 | (2006.01) |
| H04N 13/00 | (2018.01) |

(52) U.S. Cl.
CPC ......... *H04N 13/271* (2018.05); *G06K 9/4609* (2013.01); *G06T 7/521* (2017.01); *G06T 7/593* (2017.01); *H04N 5/33* (2013.01); *H04N 13/239* (2018.05); *G06T 2207/10048* (2013.01); *H04N 2013/0081* (2013.01)

(58) Field of Classification Search
CPC .............. G06K 9/4609; G06K 9/6201; G06K 9/00201; G06K 9/6289; G06K 9/2018; H04N 5/33; H04N 13/239; H04N 2013/0081; H04N 13/128; H04N 13/122; H04N 13/254; H04N 13/25; G06T 7/593; G06T 7/521; G06T 2207/10048; G06T 2207/20221; G06T 5/50
See application file for complete search history.

(56) References Cited

U.S. PATENT DOCUMENTS

| 10,380,452 B1* | 8/2019 | Piovano ............... G06T 7/50 |
| 2006/0210146 A1* | 9/2006 | Gu ..................... G06K 9/2018 |
| | | 382/154 |
| 2013/0100256 A1* | 4/2013 | Kirk ..................... G06T 7/521 |
| | | 348/48 |

(Continued)

*Primary Examiner* — Qian Yang
(74) *Attorney, Agent, or Firm* — Han IP PLLC; Andy M. Han

(57) ABSTRACT

Various examples with respect to infrared (IR) patter characteristics for stereo matching are described. A control circuit of an apparatus controls an IR projector to project a patterned IR light. In response, the control circuit receives first data of a left image of a scene from a first camera and second data of a right image of the scene from a second camera. The control circuit then performs stereo matching of the left image and the right image to generate a depth map of the scene. The patterned IR light satisfies one or more characteristic requirements.

11 Claims, 12 Drawing Sheets

(56) References Cited

U.S. PATENT DOCUMENTS

2015/0181196 A1* 6/2015 Izawa .................... H04N 9/045
          348/46
2019/0238823 A1* 8/2019 Shi ..................... G01B 11/2513

* cited by examiner

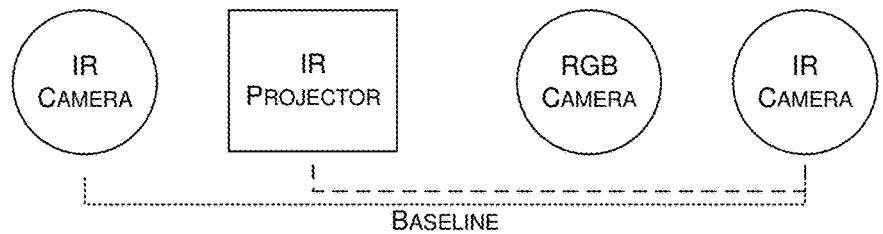
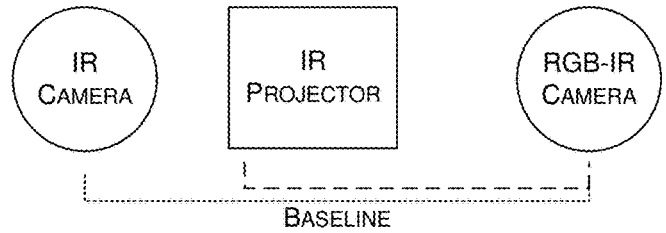
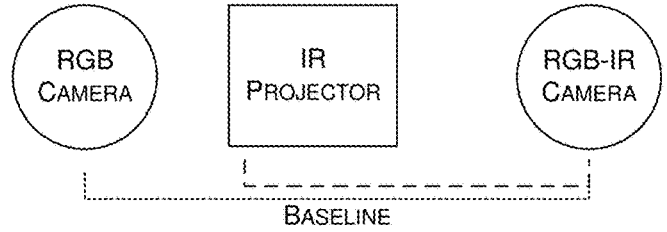
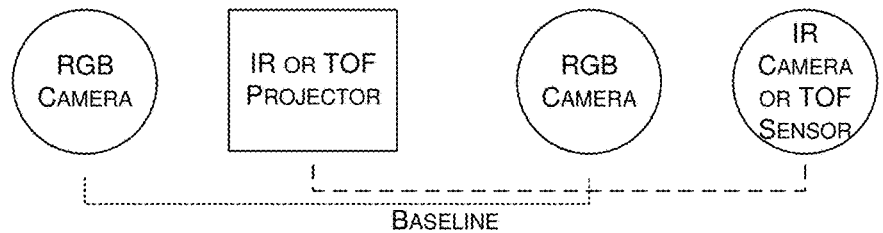
FIG. 1

IR PATTERN CHARACTERISTICS FOR ACTIVE STEREO MATCHING

CROSS REFERENCE TO RELATED PATENT APPLICATION(S)

The present disclosure is part of a non-provisional application claiming the priority benefit of U.S. Patent Application Nos. 62/651,330 and 62/651,813, filed on 2 Apr. 2018 and 3 Apr. 2018, respectively, the contents of which are incorporated by reference in their entirety.

TECHNICAL FIELD

The present disclosure is generally related to computer stereo vision and, more particularly, to infrared (IR) patter characteristics for stereo matching.

BACKGROUND

Unless otherwise indicated herein, approaches described in this section are not prior art to the claims listed below and are not admitted as prior art by inclusion in this section.

There are currently a number of techniques for range sensing and depth estimation to achieve computer stereo vision. For instance, some of the existing techniques include structured-light, passive stereo, active stereo, and time-of-flight. However, there is not a technique that combines some of those techniques. Moreover, in applications where infrared (IR) projectors and IR cameras are used for depth sensing, the components in use are often expensive. It would be desirable to have a solution that allows computer stereo vision with stereo matching by using off-the-shelf and relatively inexpensive components.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, solutions, concepts, designs, methods and apparatuses combining multiple techniques for range sensing or depth estimation. Another objective of the present disclosure is to propose schemes, solutions, concepts, designs, methods and apparatuses enabling computer stereo vision with stereo matching by using off-the-shelf and relatively inexpensive components.

In one aspect, a method may involve receiving a plurality of sensor signals that are heterogeneous in type from a plurality of sensors. The method may also involve generating first depth-related information of a scene and second depth-related information of the scene based on the plurality of sensor signals. The method may further involve fusing the first depth-related information and the second depth-related information to generate a fused depth map of the scene.

In one aspect, an apparatus may include a control circuit coupled to receive a plurality of sensor signals that are heterogeneous in type from a plurality of sensors. During operation, the control circuit may perform operations including: (a) generating first depth-related information of a scene and second depth-related information of the scene based on the plurality of sensor signals; and (b) fusing the first depth-related information and the second depth-related information to generate a fused depth map of the scene.

In one aspect, a method may involve receiving first data of a left image of a scene and second data of a right image of the scene. The method may also involve performing stereo matching of the left image and the right image to generate a depth map of the scene. The structured IR light may be projected onto the scene to light up the scene, and the structured IR light may satisfy one or more characteristic requirements.

In one aspect, a method may involve controlling an IR projector to project a structured IR light. The method may also involve receiving first data of a left image of a scene from a first camera and second data of a right image of the scene from a second camera. The method may further involve performing active stereo matching of the left image and the right image to generate a depth map of the scene. The structured IR light may satisfy one or more of a plurality of characteristic requirements, with the plurality of characteristic requirements including: (a) a pattern of the structured IR light comprising a plurality of pixels with a density satisfying a density requirement such that a number of IR pixels divided by a total number of pixels in a predefined window within the left image or the right image is greater than or equal to a first threshold; (b) the structured IR light comprising a plurality of instances of a repeated pattern such that a period of repetition of the repeated pattern along a search direction of the stereo matching is greater than an operating range of the stereo matching; and (c) a direction of repetition of the repeated pattern being rotated with respect to the search direction of the stereo matching by an angle with an absolute value greater than 0° and less than 90°.

In one aspect, an apparatus may include a control circuit which, during operation, may perform operations comprising: (a) controlling an IR projector to project a structured IR light; (b) receiving first data of a left image of a scene from a first camera and second data of a right image of the scene from a second camera; and (c) performing active stereo matching of the left image and the right image to generate a depth map of the scene. The patterned IR light may satisfy one or more characteristic requirements.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 is a diagram of an example scenario in accordance with an implementation of the present disclosure.

DETAILED DESCRIPTION OF PREFERRED IMPLEMENTATIONS

Figure 2:
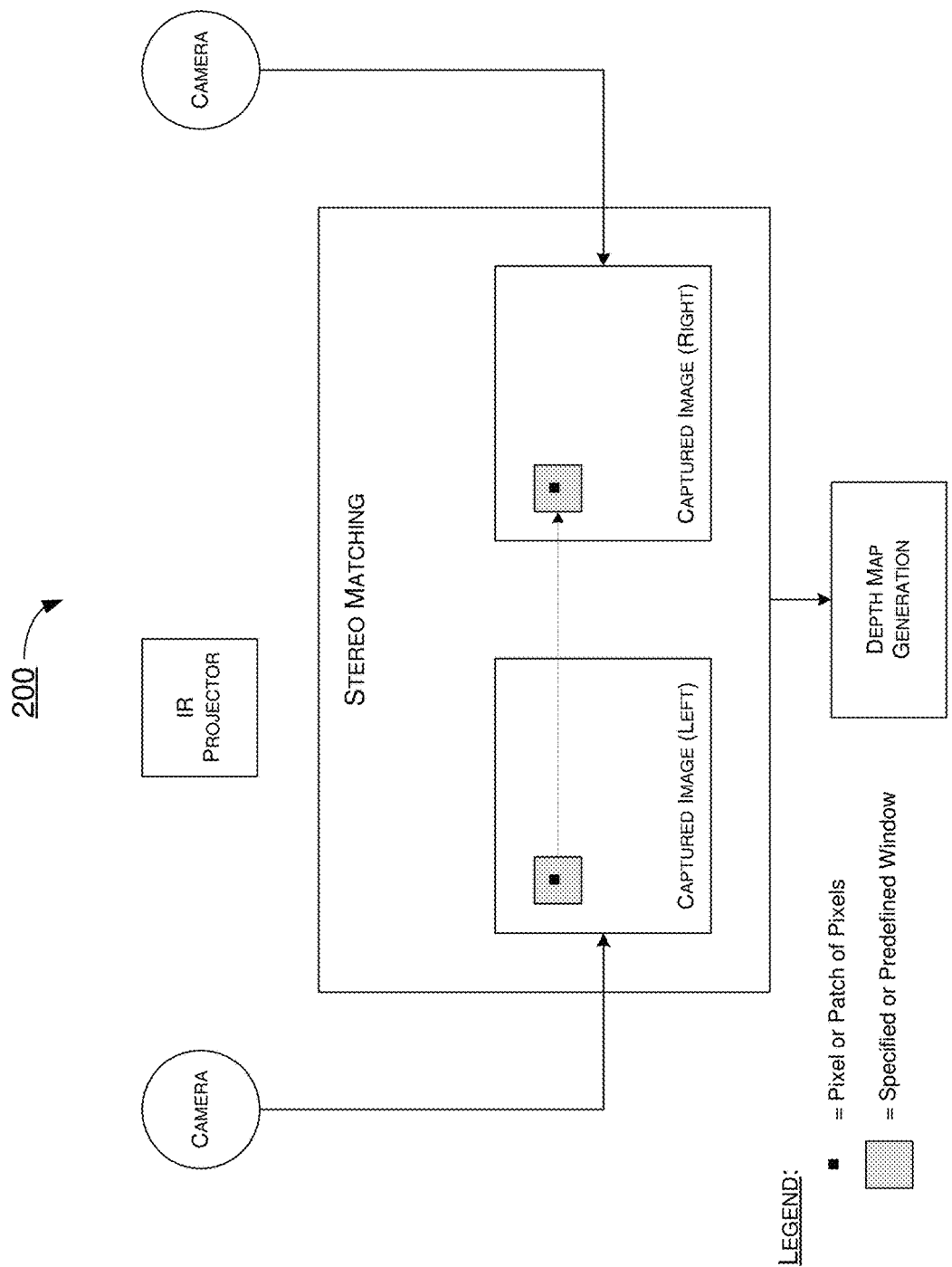
FIG. 2 is a diagram of an example scenario in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In the various techniques for range sensing and depth estimation to achieve computer stereo vision, such as structured-light, active stereo, and time-of-flight (TOF), electromagnetic waves (e.g., laser or structured light) are emitted or otherwise projected toward a scene and then stereo matching may be performed by utilizing projector-camera correspondences and/or camera-camera correspondences. Each of the depth estimation techniques provides its respective advantage(s). Under various proposed schemes in accordance with the present disclosure, accurate and full-range depth information may be provided by a proposed fusion approach. More specifically, different device configurations of sensors (e.g., cameras) and projectors may be utilized so that advantages of the different depth estimation techniques may be fused together.

FIG. 1 illustrates an example scenario 100 in accordance with an implementation of the present disclosure. Scenario 100 shows a number of different device configurations of sensors and projectors. In part (A) of scenario 100, a first example device configuration may involve two IR cameras, one IR projector, and one red-green-blue (RGB) camera. In part (B) of scenario 100, a second example device configuration may involve one IR camera, one IR projector, and one RGB camera containing pixels capable of receiving pure IR light (herein denoted as "RGB-IR camera"). In part (C) of scenario 100, a third example device configuration may involve one RGB camera, one IR projector, and one RGB-IR camera. In part (D) of scenario 100, a fourth device configuration may involve two RGB cameras, one IR projector (or TOF projector), and one IR camera (or TOF camera).

In each of the example device configurations, a physical distance between two sensors/cameras is denoted as baseline. In each of the example device configurations, a RGB camera functioning as an auxiliary RGB camera may provide color information for a depth map to be generated. Calibration of a pair of cameras and of a camera and a projector may be needed. For a pair of a projector and a camera, a structured-light or TOF approach, which is generally good at precision, may be applied. For a pair of two cameras, the stereo algorithm, which is generally god at completeness, may be applied to estimate depth. Under the proposed scheme, these results may be fused together to generate an accurate and full-range depth or depth map.

It is noteworthy that, in the device configurations in scenario 100 as well as any variation thereof, each RGB camera and RGB-IR camera may be replaced by one of the following: a monochrome camera (herein denoted as "mono camera"), a RGB camera with dual-band bandpass filtering capability with respect to visible light and IR light (herein denoted as "RGB-DB camera"), a monochrome camera containing pixels capable of receiving pure IR light (herein denoted as "mono-IR camera"), and a monochrome camera with dual-band bandpass filtering capability with respect to visible light and IR light (herein denoted as "mono-DB camera"). Moreover, each of an IR camera, a RGB camera, a RGB-IR camera, a RGB-DB camera, a mono camera, a mono-IR camera, and a mono-DB camera may be interchangeably referred to as an electromagnetic (EM) wave sensor since each of such cameras is capable of sensing EM waves in the visible and/or non-visible (e.g., IR) spectrum.

IR Characteristics for Active Stereo Matching

Under a proposed scheme in accordance with the present disclosure, a structured IR light emitted or otherwise projected by an IR projector may satisfy one or more characteristic requirements. That is, one or more characteristics of the structured IR light may be used for active stereo matching by utilizing relatively inexpensive components such as two cameras and one IR projector. Thus, cost savings may be achieved in computer stereo vision by active stereo matching without resorting to relatively expensive components.

FIG. 2 illustrates an example scenario 200 of active stereo matching in accordance with an implementation of the present disclosure. In scenario 200, active stereo matching may be performed using two cameras and one IR projector. Each of the two cameras may be an IR camera, RGB-IR camera, RGB-DB camera, mono-IR camera or mono-DB camera.

In operation, the IR projector may emit or otherwise project a structured IR light toward a scene, and each of the two cameras may capture a respective image of the scene (e.g., a left camera capturing a left image of the scene and a right camera capturing a right image of the scene). As shown in FIG. 2, active stereo matching may be performed on a given pixel or patch of pixels within a specified or predefined window in the left image and a corresponding pixel or patch of pixels within a specified or predefined window in the right image. A result of the active stereo matching may be used for generation of a depth map.

Figure 3:
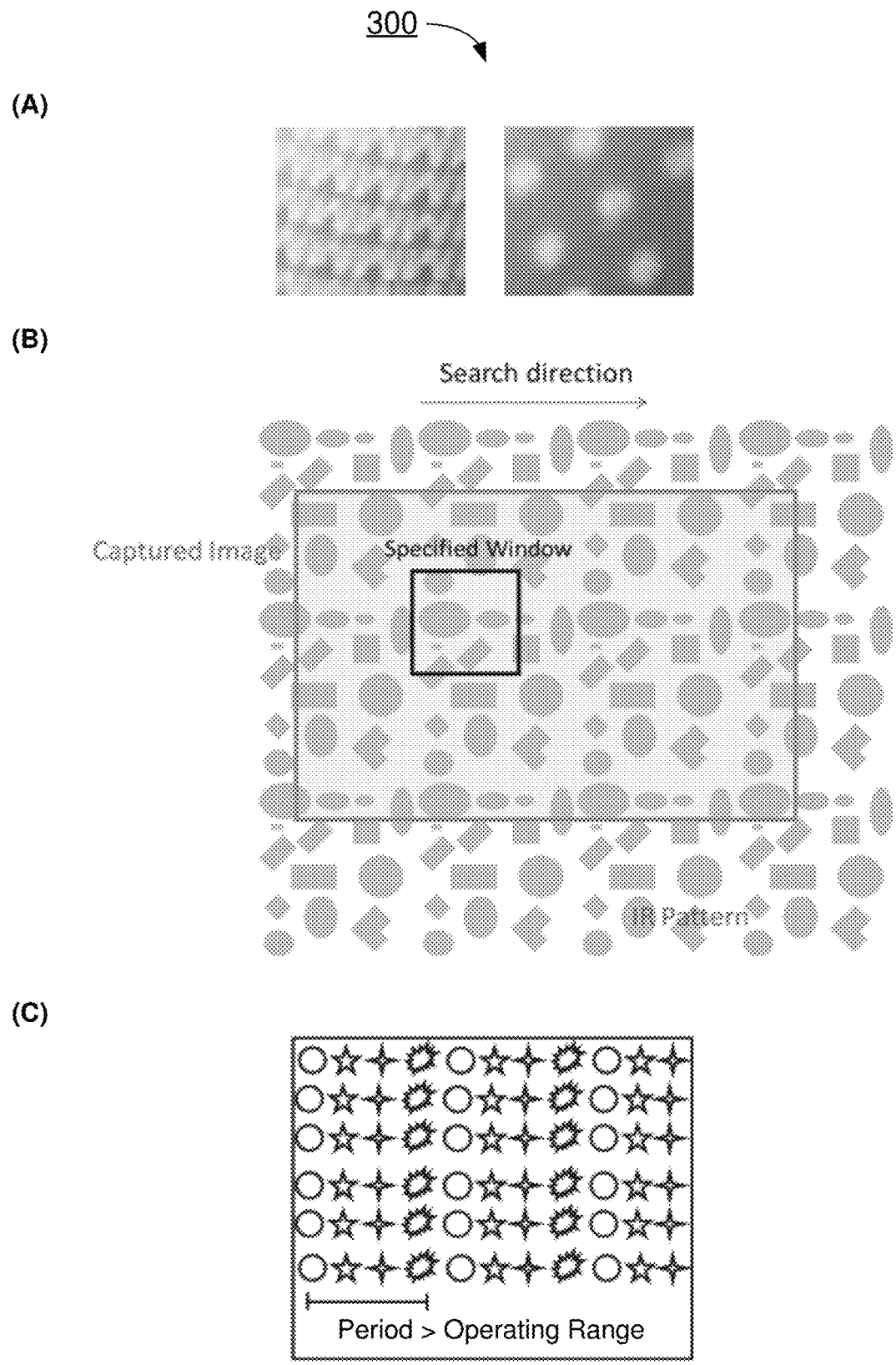
FIG. 3 is a diagram of an example scenario in accordance with an implementation of the present disclosure.

FIG. 3 illustrates an example scenario 300 in accordance with an implementation of the present disclosure. The following description of the proposed scheme with respect to IR characteristics for active stereo matching is provided with reference to FIG. 3.

Under a proposed scheme in accordance with the present disclosure, there may be no limitation or restriction on the shape of IR patterns in the structured IR light. That is, an IR pattern may be formed by a plurality of IR pixels formed in a shape of, for example and without limitation, one or more dots, one or more lines, one or more circles, one or more ovals, one or more polygons, one or more stars, or a combination thereof. The IR patterns may be different from device to device (e.g., from one IR projector to another IR projector). In other words, each device may be unique from other devices. An example of different IP patterns is shown in part (A) of scenario 300.

Under a proposed scheme in accordance with the present disclosure, a density of IR patterns of the structured IR light may be high enough such that each patch of pixels may be distinguishable. The density may be expressed as (number or occurrence of pixels/unit area), and the unit area may be expressed as (width×height pixels$^2$). Referring to part (B) of scenario 300, the density of IR patterns in concern may be the density with respect to a specified or predefined window within a captured IR image (e.g., from an IR camera, RGB-IR camera, RGB-DB camera, mono-IR camera or mono-DB camera) having a plurality of IR patterns. Part (B) of scenario 300 also shows a search direction for active stereo matching.

Thus, under the proposed scheme, a pattern of the structured IR light may include a plurality of pixels with a density satisfying a density requirement as follows: (number of IR pixels/total number of pixels in a predefined window within a captured IR image)≥a first threshold. Here, the first threshold (or threshold 1) may be used to constrain the density of IR patterns in a given window of IR image. Moreover, threshold 1 may be determined by the quality of output depth map. The value of threshold 1 may be, for example, 0.2 with a unit of 1/pixel.

Under a proposed scheme in accordance with the present disclosure, in an event that a given pattern is repeated numerous times (herein denoted as "repeated pattern"), the period of repetition of the repeated pattern along a search direction of the active stereo matching may be greater than an operating range of the active stereo matching. The operating range may be, for example and without limitation, a predefined window equivalent to the specified window shown in part (B) of scenario 300. For illustrative purposes and without limitation, part (C) of scenario 300 shows an example in which a period of repetition of a repeated pattern is less than an operating range.

Under a proposed scheme in accordance with the present disclosure, an ambiguity within a search range along the search direction of stereo matching may be relatively low. The ambiguity of each pixel or each patch of pixels may be calculated using a defined cost function. The ambiguity of each pixel or patch of pixels may be calculated using a defined cost function. The value of the smallest cost value over the second smallest cost value may be the ambiguity value. The ambiguity value should be lower than a threshold (e.g., 0.8).

Figure 4:
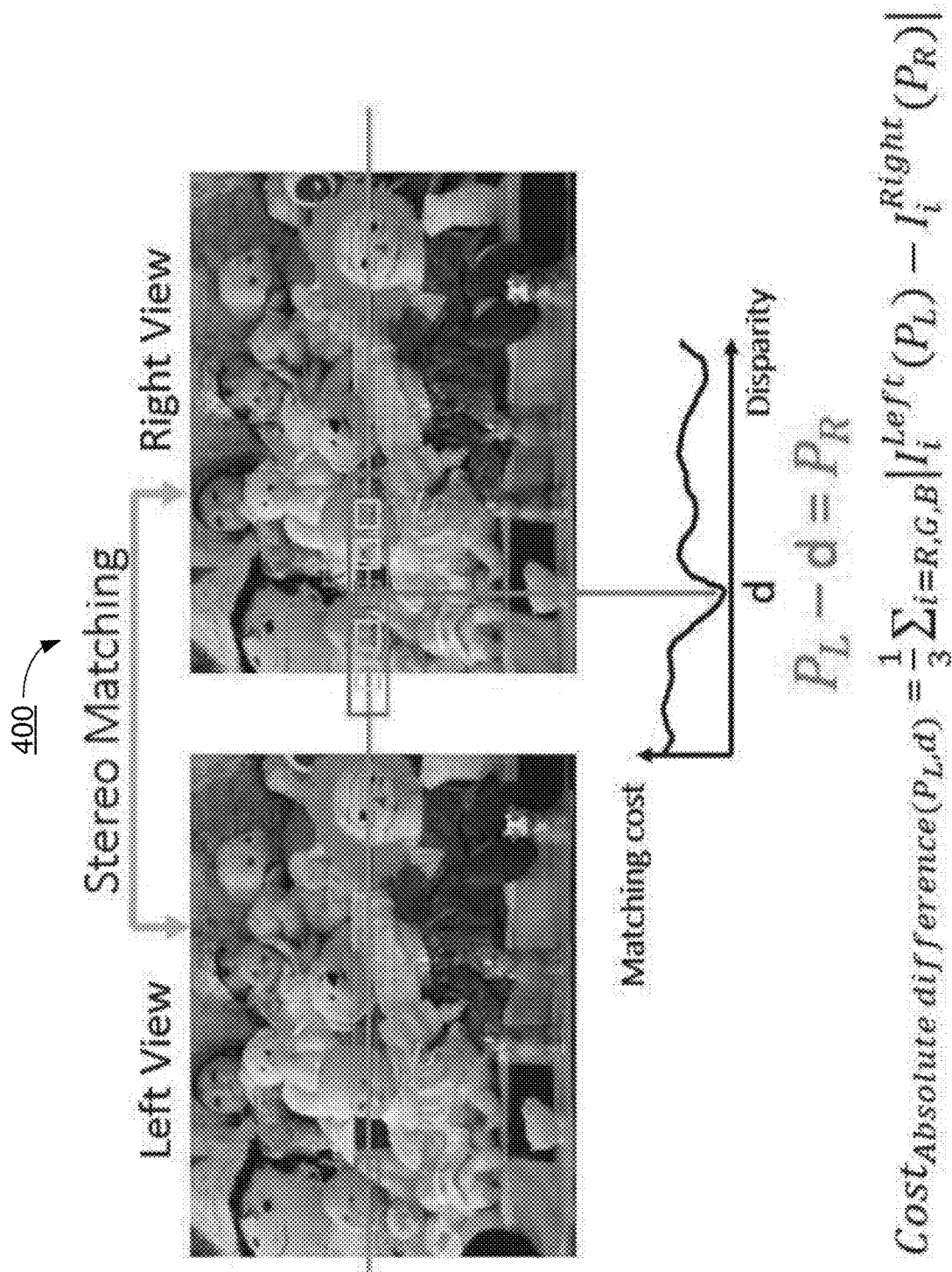
FIG. 4 is a diagram of an example scenario in accordance with an implementation of the present disclosure.

FIG. 4 illustrates an example scenario 400 in accordance with an implementation of the present disclosure. In scenario 400, an ambiguity value of each pixel or each patch of pixels within a search range along a search direction of stereo matching is less than or equal to a second threshold (or threshold 2), which may be 0.8 for example. For instance, in performing the stereo matching of the left image and the right image comprises calculating the ambiguity value using a cost function of a cost value (or matching cost value) of a difference between a left image of a left perspective and a right image of a right perspective. The cost function may be expressed mathematically as:

$$\text{Cost}_{absolute\ difference}(PL,d) = 1/3 * \Sigma_{i=R,G,B} |I_i^{left}(P_L) - I_i^{right}(P_R)|,$$

Here, $I_i^{left}(P_L)$ may denote a luminance (or color response) of a current pixel within a patch in the left image (denoted as "$P_L$"), and $I_i^{right}(P_R)$ may denote a luminance (or color response) of the current pixel within a reference patch in the right image (denoted as "$P_R$") during the stereo matching. Under the proposed scheme, in calculating the ambiguity value using the cost function, the ambiguity value may be calculated by dividing a smallest cost value from the cost function by a second smallest cost value from the cost function.

Figure 5:
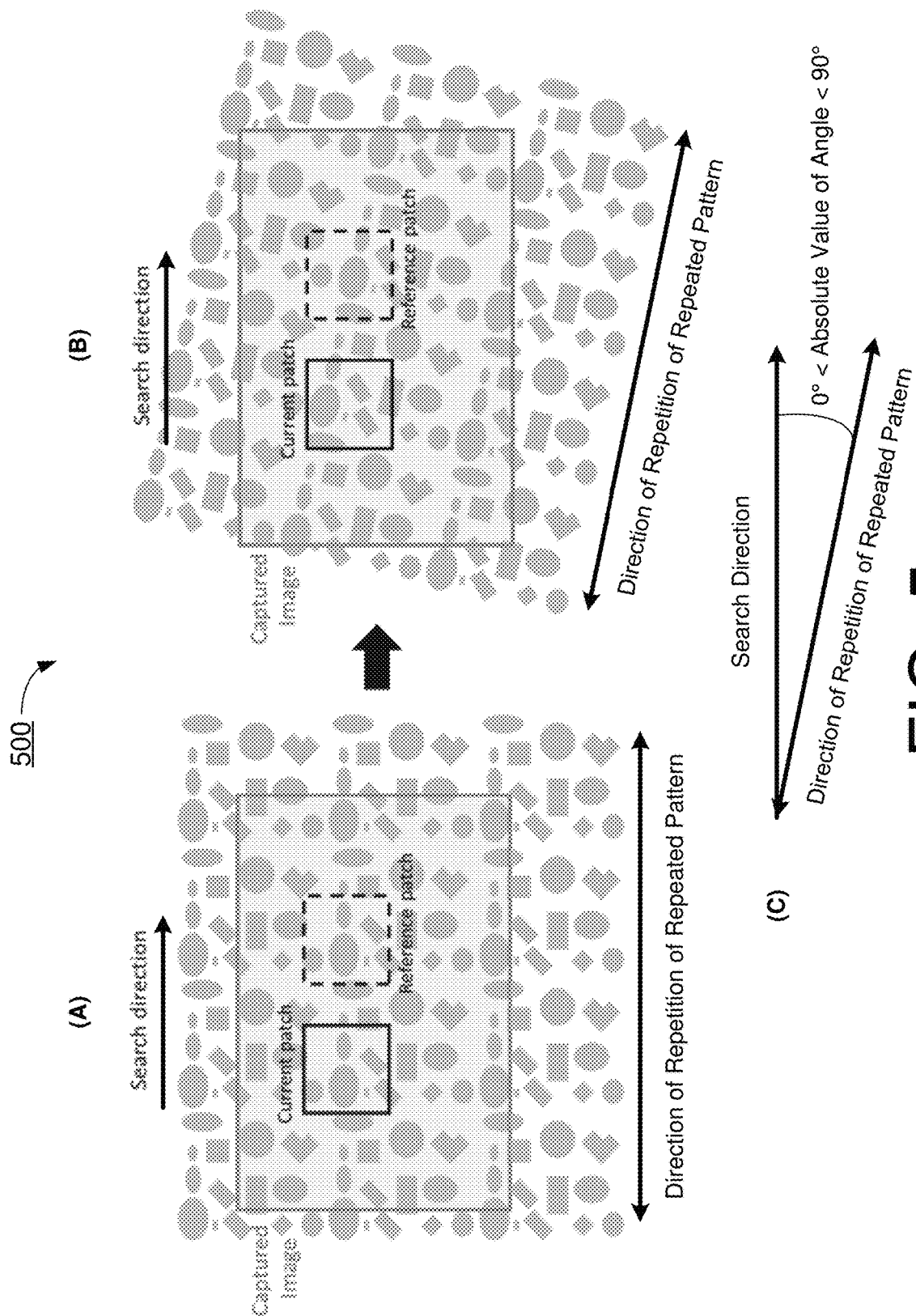
FIG. 5 is a diagram of an example scenario in accordance with an implementation of the present disclosure.

Under a proposed scheme in accordance with the present disclosure, a repeatability of the repeated pattern along a direction of stereo matching may be reduced with a tilt or rotation angle of IR pattern(s) to follow the constraint of low ambiguity. The absolute value of a tilt or rotation angle may be greater than 0° and less than 90°. FIG. 5 illustrates an example scenario 500 in accordance with an implementation of the present disclosure. In part (A) of scenario 500, a direction of repetition of the repeated pattern is along or parallel with a search direction of stereo matching. In part (B) of scenario 500, the direction of repetition of the repeated pattern is rotated with respect to the search direction of stereo matching. In part (C) of scenario 500, the absolute value of the tilt/rotation angle may be greater than 0° and less than 90°.

Depth Fusion

Figure 6:
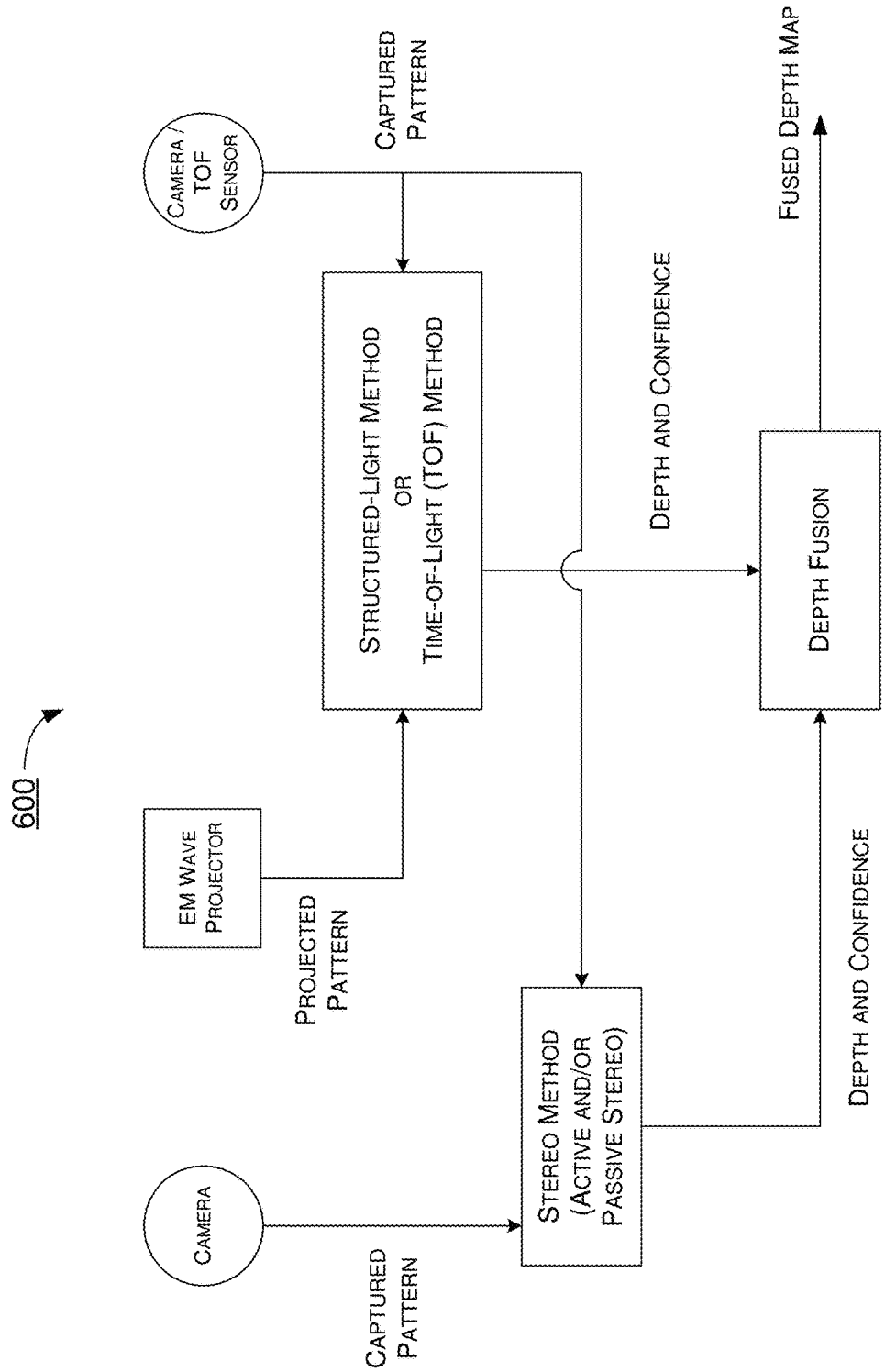
FIG. 6 is a diagram of an example scenario in accordance with an implementation of the present disclosure.

Under a proposed scheme in accordance with the present disclosure, accurate and full-range depth information may be obtained by fusing depth information from different depth estimation techniques such as structured-light, passive stereo, active stereo and TOF. FIG. 6 illustrates an example scenario 600 of depth fusion in accordance with an implementation of the present disclosure. Scenario 600 may involve an EM wave projector and two sensors. The EM wave projector may be utilized to emit or otherwise project a pattern. The EM wave projector may be, for example, an IR projector or a TOF projector (e.g., a light detection and ranging (LiDAR) projector). The two sensors may be a pair of cameras or one camera plus one TOF sensor. As a camera, each sensor may be a RGB camera, a RGB-IR camera, a RGB-DB camera, a mono camera, a mono-IR camera or a mono-DB camera.

In operation, the EM wave projector may emit or otherwise project a pattern, and a captured pattern from a first camera of the two sensors may be utilized by a structured-light method or a TOF method to obtain a depth map and a confidence map. Additionally, the captured pattern from the first camera and a captured pattern from a second camera of the two sensors may be utilized by a stereo method (e.g., active stereo and/or passive stereo) to obtain a depth map and a confidence map. Then, the depth map and confidence map from the structured-light/TOF method as well as the depth map and confidence map from the stereo method may be fused together by depth fusion to generate a fused depth map. In scenario 600, depth fusion may be performed by utilizing either of fusion method 700 and fusion method 800 described below.

Figure 7:
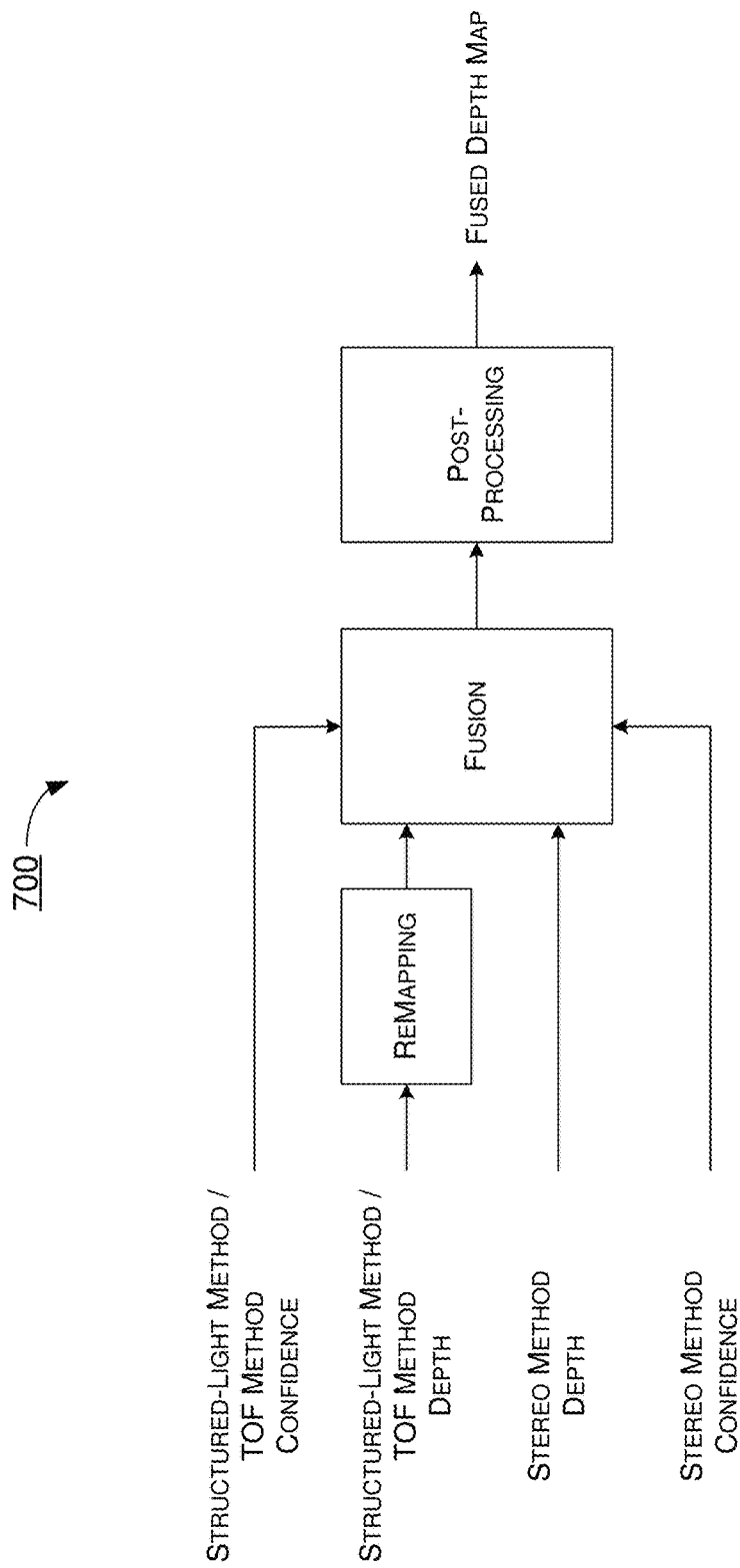
FIG. 7 is a diagram of an example fusion method in accordance with an implementation of the present disclosure.

FIG. 7 illustrates an example fusion method 700 in accordance with an implementation of the present disclosure. In fusion method 700, the depth map from one of the methods (e.g., the structured-light/TOF method) may be remapped first and then fused with the depth map from the other method (e.g., the stereo method) by taking into account the confidence map from the structured-light/TOF method as well as the confidence map from the stereo method to provide a fused result. Then, post-processing may be performed on the fused result to generate a fused depth map.

Remapping of the depth map from one of the methods is needed because of different baselines between the different methods.

In fusion method 700, the confidence map of a given method, confidence (peak ratio naïve), may be expressed as follows:

$$C_{PKRN} = \text{second smallest value of cost/smallest value of cost}$$

Here, the value of cost may be generated by an algorithm, such as taking an absolute difference between two captured images, which may be expressed as follows:

$$\text{Cost}_{absolute\ difference}(PL,d) = \tfrac{1}{3}\Sigma_{i=R,G,B}|I_i^{left}(P_L) - I_i^{right}(P_R)|$$

Here, I denotes image intensity, $P_L$ denotes a pixel (or patch of pixels) in the left image, and $P_R$ denotes a pixel (or patch of pixels) in the right image. As for post-processing, post-processing in fusion method may involve edge aware filter and segmentation. Moreover, depth fusion may be expressed as follows:

$$D(p) = \arg\max_d(\text{Conf}(\text{stereo}(p)), \text{Conf}(\text{structured light}(p)))$$

Here, p may denote each pixel in a given depth map, and Conf( ) may denote a confidence map.

Figure 8:
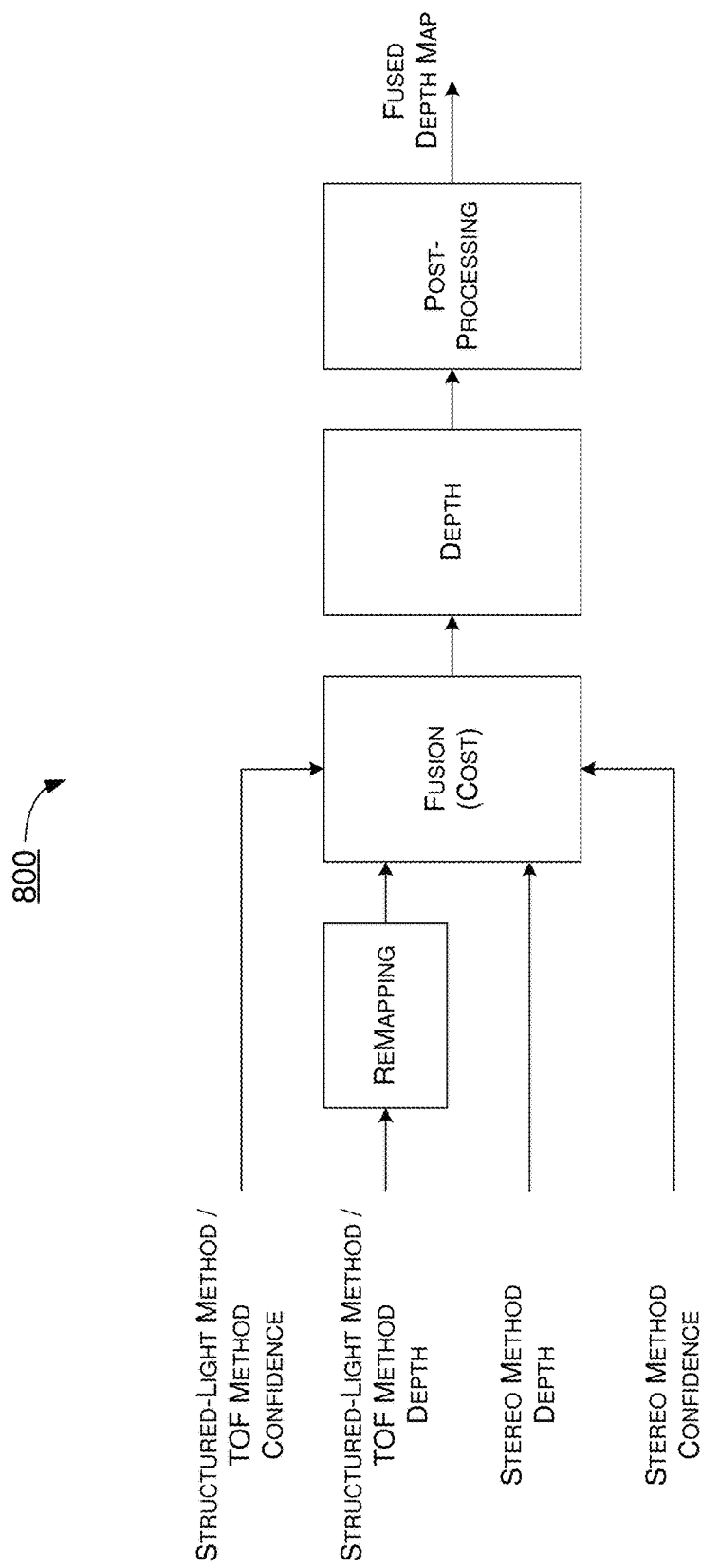
FIG. 8 is a diagram of an example fusion method in accordance with an implementation of the present disclosure.

FIG. 8 illustrates an example fusion method 800 in accordance with an implementation of the present disclosure. Fusion method 800 may be similar to fusion method 700 with some difference. For instance, in fusion method 800, fusion may be estimated in the stage of cost volume. The cost volume, which is generated by each of the structured-light method and stereo method, may be combined and optimized to obtain a much more correct depth map. In fusion method 800, depth fusion may be expressed as follows:

$$\text{Cost}(p,d) = \text{weight}_{Conf(stereo)} \times \text{cost}_{stereo(p,d)} + \text{weight}_{Conf(structured\ light)} \times \text{cost}_{structured\ light(p,d)}$$

Under the proposed scheme, fusion method 700 and fusion method 800 may be utilized independently for different situations and applications. For a general implementation with two sensors and one projector, the depth quality may be significantly different while covering arbitrary one component, and this is important for ambiguity.

Illustrative Implementations

Figure 9:
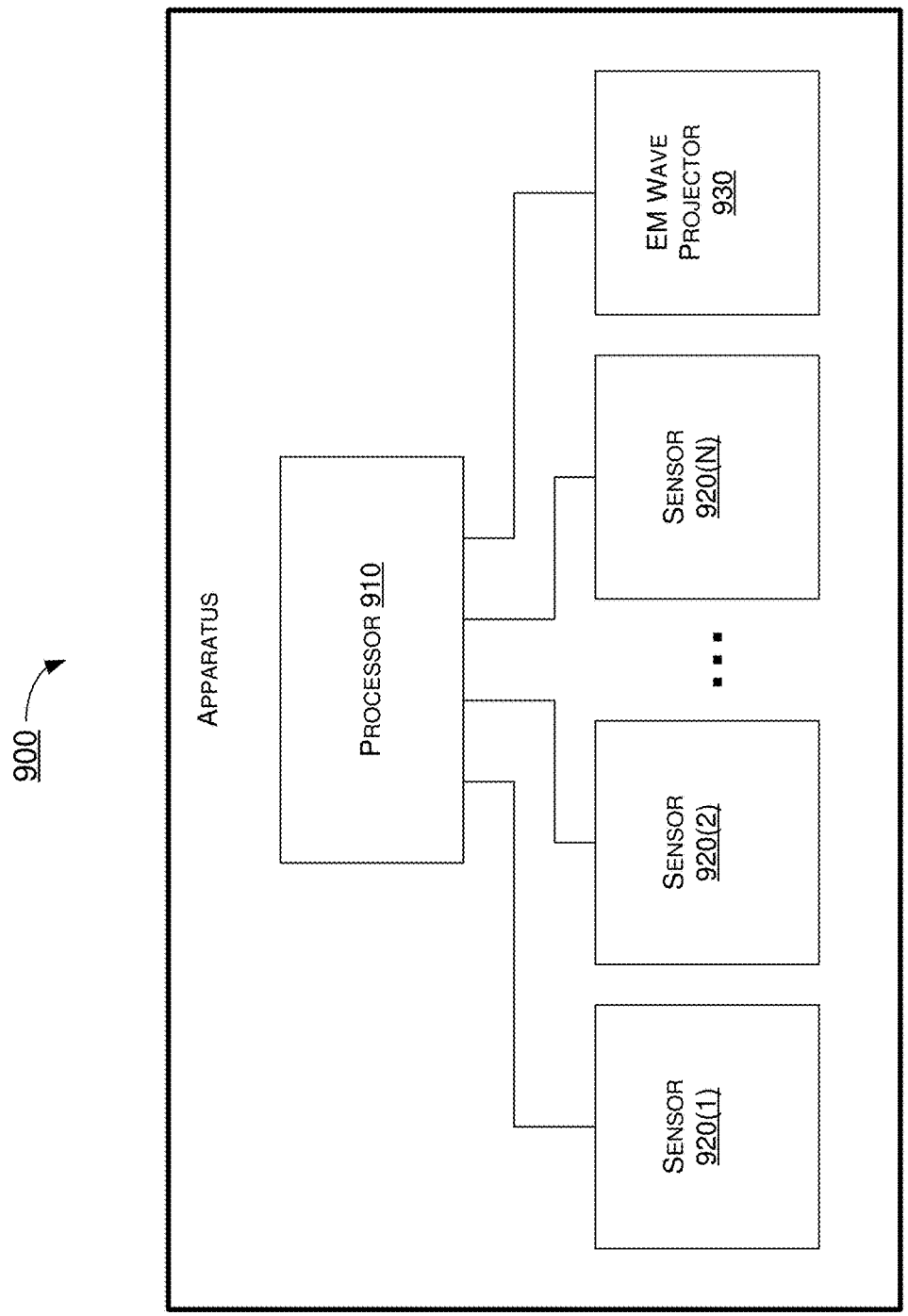
FIG. 9 is a diagram of an example apparatus in accordance with an implementation of the present disclosure.

FIG. 9 illustrates an example apparatus 900 in accordance with an implementation of the present disclosure. Apparatus 900 may perform various functions to implement procedures, schemes, techniques, processes and methods described herein pertaining to visual depth sensing with accurate and full-range depth fusion and sensing as well as IR pattern characteristics for active stereo matching, including the various procedures, scenarios, schemes, solutions, concepts and techniques described above with respect to FIG. 1~FIG. 8 as well as processes 1000, 1100 and 1200 described below.

Apparatus 900 may be a part of an electronic apparatus, a portable or mobile apparatus, a wearable apparatus, a wireless communication apparatus or a computing apparatus. For instance, apparatus 900 may be implemented in a smartphone, a smartwatch, a personal digital assistant, a digital camera, or a computing equipment such as a tablet computer, a laptop computer or a notebook computer. Moreover, apparatus 900 may also be a part of a machine type apparatus, which may be an IoT or NB-IoT apparatus such as an immobile or a stationary apparatus, a home apparatus, a wire communication apparatus or a computing apparatus. For instance, apparatus 900 may be implemented in a smart thermostat, a smart fridge, a smart door lock, a wireless speaker or a home control center. Alternatively, apparatus 900 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Apparatus 900 may include at least some of those components shown in FIG. 9 such as a control circuit 910, a plurality of sensors 920(1)~920(N), and at least one EM wave projector 930, with N being a positive integer greater than 1. Apparatus 900 may further include one or more other components not pertinent to the proposed scheme of the present disclosure (e.g., internal power supply, display device and/or user interface device), and, thus, such component(s) of apparatus 900 are neither shown in FIG. 9 nor described below in the interest of simplicity and brevity.

In one aspect, control circuit 910 may be implemented in the form of an electronic circuit comprising various electronic components. Alternatively, control circuit 910 may be implemented as part of or in the form of one or more single-core processors, one or more multi-core processors, one or more RISC processors, or one or more CISC processors. That is, even though a singular term "a processor" is used herein to refer to control circuit 910, control circuit 910 may include multiple processors in some implementations and a single processor in other implementations in accordance with the present disclosure. In another aspect, control circuit 910 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, control circuit 910 is a special-purpose machine specifically designed, arranged and configured to perform specific tasks pertaining to visual depth sensing with accurate and full-range depth fusion and sensing as well as IR pattern characteristics for active stereo matching in accordance with various implementations of the present disclosure. In some implementations, control circuit 910 may include an electronic circuit with hardware components implementing one or more of the various proposed schemes in accordance with the present disclosure. Alternatively, other than hardware components, control circuit 910 may also utilize software codes and/or instructions in addition to hardware components to implement visual depth sensing with accurate and full-range depth fusion and sensing as well as IR pattern characteristics for active stereo matching in accordance with various implementations of the present disclosure.

Each of the plurality of sensors 920(1)~920(N) may be a camera or a TOF sensor. In the context of camera, the respective sensor may be an IR camera, a RGB camera, a mono camera, a RGB-IR camera, a mono-IR camera, a RGB-BD camera or a mono-BD camera. EM wave projector may be an IR projector or a TOF projector.

Under various proposed schemes in accordance with the present disclosure, with respect to visual depth sensing with accurate and full-range depth fusion and sensing, control circuit 910 may receive a plurality of sensor signals that are heterogeneous in type from the plurality of sensors 920(1)~920(N). Additionally, control circuit 910 may generate first depth-related information of a scene and second depth-related information of the scene based on the plurality of sensor signals. Moreover, control circuit 910 may fuse the first depth-related information and the second depth-related information to generate a fused depth map of the scene.

In some implementations, in receiving the plurality of sensor signals that are heterogeneous in type from the plurality of sensors 920(1)~920(N), control circuit 910 may receive the plurality of sensor signals from two or more of the following: a RGB camera, a mono camera, an IR camera, an RGB-IR camera, a mono-IR camera, a RGB-DB camera, a mono-DB camera, and a TOF sensor.

In some implementations, in generating the first depth-related information and the second depth-related information, control circuit 910 may perform a number of operations. For instance, control circuit 910 may generate a first depth map and a first confidence map based on at least a first sensor signal of the plurality of sensor signals 920(1)~920(N) of a first type. Additionally, control circuit 910 may generate a second depth map and a second confidence map based on at least a second sensor signal of the plurality of sensor signals 920(1)~920(N) of a second type different from the first type.

In some implementations, in generating the first depth map and the first confidence map, control circuit 910 may generate the first depth map and the first confidence map using a structured-light method or a TOF method. In some implementations, in generating the second depth map and the second confidence map, control circuit 910 may generate the second depth map and the second confidence map using an active stereo method or a passive stereo method.

In some implementations, in fusing the first depth-related information and the second depth-related information to generate the fused depth map, control circuit 910 may perform a number of operations. For instance, control circuit 910 may remap the first depth map with respect to the second depth map to generate a remapped first depth map. Moreover, control circuit 910 may fuse the remapped first depth map, the second depth map, the first confidence map and the second confidence map to provide a fused result. Furthermore, control circuit 910 may perform post-processing on the fused result to generate the fused depth map.

Alternatively, in fusing the first depth-related information and the second depth-related information to generate the fused depth map, control circuit 910 may perform other operations. For instance, control circuit 910 may remap the first depth map with respect to the second depth map to generate a remapped first depth map. Additionally, control circuit 910 may estimate a cost volume associated with the generating of the first depth map and the first confidence map. Moreover, control circuit 910 may fuse the remapped first depth map, the second depth map, the first confidence map, the second confidence map and the cost volume to provide a fused result. Furthermore, control circuit 910 may perform post-processing on the fused result to generate the fused depth map. Additionally, in generating the first depth map and the first confidence map, control circuit 910 may generate the first depth map and the first confidence map using a structured-light method or a TOF method.

In some implementations, in estimating the cost volume, control circuit 910 may estimate the cost volume by calculating a combination of a weighted cost associated with a stereo method and a weighted cost associated with a structured-light method.

In some implementations, in fusing the first depth-related information and the second depth-related information to generate the fused depth map, control circuit 910 may perform a number of operations. For instance, control circuit 910 may determine whether to fuse the first depth-related information and the second depth-related information using a first fusion method or a second fusion method. Then, based on a result of the determining, control circuit 910 may fuse the first depth-related information and the second depth-related information using either the first fusion method or the second fusion method. The first fusion method may involve: (a1) remapping the first depth map with respect to the second depth map to generate a remapped first depth map; (b1) fusing the remapped first depth map, the second depth map, the first confidence map and the second confidence map to provide a fused result; and (c1) performing post-processing on the fused result to generate the fused depth map. The second fusion method may involve: (a2) remapping the first depth map with respect to the second depth map to generate the remapped first depth map; (b2) estimating a cost volume associated with the generating of the first depth map and the first confidence map; (c2) fusing the remapped first depth map, the second depth map, the first confidence map, the second confidence map and the cost volume to provide a fused result; and (d2) performing post-processing on the fused result to generate the fused depth map. In some implementations, in the second fusion method, the first depth map and the first confidence map may be generated using a structured-light method or a TOF method.

In some implementations, control circuit 910 may control EM wave projector 930 to emit electromagnetic waves toward the scene. The EM wave projector 930 may include an IR projector or a TOF projector.

In some implementations, control circuit 910 may calibrate a pair of sensors of the plurality of sensors 920(1)~920(N) or one of the plurality of sensors 920(1)~920(N) plus the EM wave projector 930.

Under a proposed scheme in accordance with the present disclosure, with respect to IR pattern characteristics for active stereo matching, control circuit 910 may control EM wave projector 920 (e.g., IR projector) to project a structured IR light. Moreover, control circuit 910 may receive first data of a left image of a scene from a first camera (e.g., sensor 920(1)) and second data of a right image of the scene from a second camera (e.g., sensor 920(2)). Furthermore, control circuit 910 may perform stereo matching (e.g., active stereo matching) of the left image and the right image to generate a depth map of the scene. The structured IR light may satisfy one or more characteristic requirements.

In some implementations, a pattern of the structured IR light may include a plurality of IR pixels formed in a shape of one or more dots, one or more lines, one or more circles, one or more ovals, one or more polygons, one or more stars, or a combination thereof.

In some implementations, a pattern of the structured IR light may include a plurality of pixels with a density satisfying a density requirement such that a number of IR pixels divided by a total number of pixels in a predefined window within the left image or the right image is greater than or equal to a first threshold.

In some implementations, the first threshold may be 0.2.

In some implementations, the structured IR light may include a plurality of instances of a repeated pattern. In such cases, a period of repetition of the repeated pattern along a search direction of the stereo matching may be greater than an operating range of the stereo matching.

In some implementations, a direction of repetition of the repeated pattern may be rotated with respect to the search direction of the stereo matching by an angle with an absolute value greater than 0° and less than 90°.

In some implementations, an ambiguity value of each pixel or each patch of pixels within a search range along a direction of stereo matching may be less than or equal to a second threshold.

In some implementations, in performing the stereo matching of the left image and the right image, control circuit 910 may calculate the ambiguity value using a cost function of a cost value of a difference between the left image and the right image. In some implementations, the cost function may be expressed mathematically as follows:

$$\text{Cost}_{absolute\ difference}(PL,d) = \frac{1}{3} * \Sigma_{i=R,G,B} |I_i^{left}(P_L) - I_i^{right}(P_R)|,$$

Here, $I_i^{left}(P_L)$ may denote a luminance of a current pixel within a patch in the left image, and $I_i^{right}(P_R)$ may denote a luminance of the current pixel within a reference patch in the right image during the stereo matching.

In some implementations, in calculating the ambiguity value using the cost function, control circuit 910 may calculate the ambiguity value by dividing a smallest cost value from the cost function by a second smallest cost value from the cost function.

In some implementations, the second threshold may be 0.8.

In some implementations, in performing the stereo matching of the left image and the right image, control circuit 910 may perform active stereo matching of the left image and the right image.

Under another proposed scheme in accordance with the present disclosure, with respect to IR pattern characteristics for active stereo matching, control circuit 910 may control EM wave projector 930 (e.g., IR projector) to project a structured IR light. Additionally, control circuit 910 may receive first data of a left image of a scene from a first camera (e.g., sensor 920(1)) and second data of a right image of the scene from a second camera (e.g., sensor 920(2)). Moreover, control circuit 910 may perform active stereo matching of the left image and the right image to generate a depth map of the scene. The structured IR light may satisfy one or more of a plurality of characteristic requirements. In some implementations, the plurality of characteristic requirements may include: (1) a pattern of the structured IR light comprising a plurality of pixels with a density satisfying a density requirement such that a number of IR pixels divided by a total number of pixels in a predefined window within the left image or the right image is greater than or equal to a first threshold; (2) the structured IR light comprising a plurality of instances of a repeated pattern such that a period of repetition of the repeated pattern along a search direction of the stereo matching is greater than an operating range of the stereo matching; and (3) a direction of repetition of the repeated pattern being rotated with respect to the search direction of the stereo matching by an angle with an absolute value greater than 0° and less than 90°.

In some implementations, a pattern of the structured IR light may include a plurality of IR pixels formed in a shape of one or more dots, one or more lines, one or more circles, one or more ovals, one or more polygons, one or more stars, or a combination thereof.

In some implementations, an ambiguity value of each pixel or each patch of pixels within a search range along a direction of stereo matching may be less than or equal to a second threshold.

In some implementations, in performing the stereo matching of the left image and the right image, control circuit 910 may calculate the ambiguity value using a cost function of a cost value of a difference between the left image and the right image. In some implementations, the cost function may be expressed mathematically as follows:

$$\text{Cost}_{absolute\ difference}(PL,d) = \frac{1}{3} * \Sigma_{i=R,G,B} |I_i^{left}(P_L) - I_i^{right}(P_R)|,$$

Here, $I_i^{left}(P_L)$ may denote a luminance of a current pixel within a patch in the left image, and $I_i^{right}(P_R)$ may denote a luminance of the current pixel within a reference patch in the right image during the stereo matching. Moreover, the first threshold may be 0.2, and the second threshold may be 0.8.

In some implementations, in calculating the ambiguity value using the cost function, control circuit 910 may calculate the ambiguity value by dividing a smallest cost value from the cost function by a second smallest cost value from the cost function.

Illustrative Processes

Figure 10:
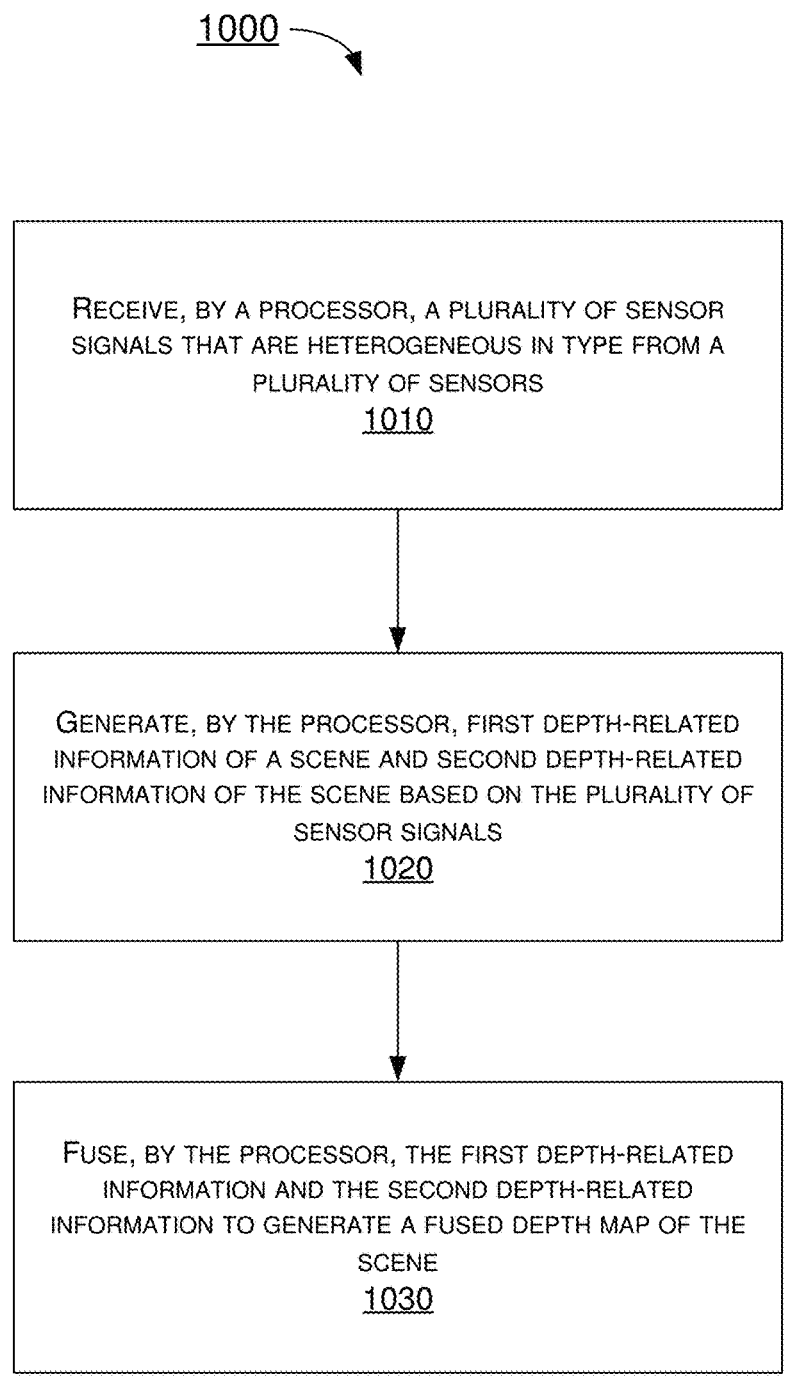
FIG. 10 is a flowchart of an example process in accordance with an implementation of the present disclosure.

FIG. 10 illustrates an example process 1000 in accordance with an implementation of the present disclosure. Process 1000 may be an example implementation of the various procedures, scenarios, schemes, solutions, concepts and techniques, or a combination thereof, whether partially or completely, with respect to visual depth sensing with accurate and full-range depth fusion and sensing in accordance with the present disclosure. Process 1000 may represent an aspect of implementation of features of apparatus 900. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks of process 1000 may executed in the order shown in FIG. 10 or, alternatively, in a different order. Furthermore, one or more of the blocks of process 1000 may be repeated one or more times. Process 1000 may be implemented by apparatus 900 or any variation thereof. Solely for illustrative purposes and without limitation, process 1000 is described below in the context of apparatus 900. Process 1000 may begin at block 1010.

At 1010, process 1000 may involve control circuit 910 receiving a plurality of sensor signals that are heterogeneous in type from a plurality of sensors 920(1)~920(N). Process 1000 may proceed from 1010 to 1020.

At 1020, process 1000 may involve control circuit 910 generating first depth-related information of a scene and second depth-related information of the scene based on the plurality of sensor signals. Process 1000 may proceed from 1020 to 1030.

At 1030, process 1000 may involve control circuit 910 fusing the first depth-related information and the second depth-related information to generate a fused depth map of the scene.

In some implementations, in receiving the plurality of sensor signals that are heterogeneous in type from the plurality of sensors 920(1)~920(N), process 1000 may involve control circuit 910 receiving the plurality of sensor signals from two or more of the following: a RGB camera, a mono camera, an IR camera, an RGB-IR camera, a mono-IR camera, a RGB-DB camera, a mono-DB camera, and a TOF sensor.

In some implementations, in generating the first depth-related information and the second depth-related information, process 1000 may involve control circuit 910 performing a number of operations. For instance, process 1000 may involve control circuit 910 generating a first depth map and a first confidence map based on at least a first sensor signal of the plurality of sensor signals 920(1)~920(N) of a first type. Additionally, process 1000 may involve control circuit 910 generating a second depth map and a second confidence map based on at least a second sensor signal of the plurality of sensor signals 920(1)~920(N) of a second type different from the first type.

In some implementations, in generating the first depth map and the first confidence map, process 1000 may involve control circuit 910 generating the first depth map and the first confidence map using a structured-light method or a TOF method. In some implementations, in generating the second depth map and the second confidence map, process 1000 may involve control circuit 910 generating the second depth map and the second confidence map using an active stereo method or a passive stereo method.

In some implementations, in fusing the first depth-related information and the second depth-related information to generate the fused depth map, process 1000 may involve control circuit 910 performing a number of operations. For instance, process 1000 may involve control circuit 910 remapping the first depth map with respect to the second depth map to generate a remapped first depth map. Moreover, process 1000 may involve control circuit 910 fusing the remapped first depth map, the second depth map, the first confidence map and the second confidence map to provide a fused result. Furthermore, process 1000 may involve control circuit 910 performing post-processing on the fused result to generate the fused depth map.

Alternatively, in fusing the first depth-related information and the second depth-related information to generate the fused depth map, process 1000 may involve control circuit 910 performing other operations. For instance, process 1000 may involve control circuit 910 remapping the first depth map with respect to the second depth map to generate a remapped first depth map. Additionally, process 1000 may involve control circuit 910 estimating a cost volume associated with the generating of the first depth map and the first confidence map. Moreover, process 1000 may involve control circuit 910 fusing the remapped first depth map, the second depth map, the first confidence map, the second confidence map and the cost volume to provide a fused result. Furthermore, process 1000 may involve control circuit 910 performing post-processing on the fused result to generate the fused depth map. Additionally, in generating the first depth map and the first confidence map, process 1000 may involve control circuit 910 generating the first depth map and the first confidence map using a structured-light method or a TOF method.

In some implementations, in estimating the cost volume, process 1000 may involve control circuit 910 estimating the cost volume by calculating a combination of a weighted cost associated with a stereo method and a weighted cost associated with a structured-light method.

In some implementations, in fusing the first depth-related information and the second depth-related information to generate the fused depth map, process 1000 may involve control circuit 910 performing a number of operations. For instance, process 1000 may involve control circuit 910 determining whether to fuse the first depth-related information and the second depth-related information using a first fusion method or a second fusion method. Then, based on a result of the determining, process 1000 may involve control circuit 910 fusing the first depth-related information and the second depth-related information using either the first fusion method or the second fusion method. The first fusion method may involve: (a1) remapping the first depth map with respect to the second depth map to generate a remapped first depth map; (b1) fusing the remapped first depth map, the second depth map, the first confidence map and the second confidence map to provide a fused result; and (c1) performing post-processing on the fused result to generate the fused depth map. The second fusion method may involve: (a2) remapping the first depth map with respect to the second depth map to generate the remapped first depth map; (b2) estimating a cost volume associated with the generating of the first depth map and the first confidence map; (c2) fusing the remapped first depth map, the second depth map, the first confidence map, the second confidence map and the cost volume to provide a fused result; and (d2) performing post-processing on the fused result to generate the fused depth map. In some implementations, in the second fusion method, the first depth map and the first confidence map may be generated using a structured-light method or a TOF method.

In some implementations, process 1000 may further involve control circuit 910 controlling an electromagnetic wave projector to emit electromagnetic waves toward the scene. The electromagnetic wave projector may include an IR projector or a TOF projector.

In some implementations, process 1000 may further involve control circuit 910 calibrating a pair of sensors of the plurality of sensors or one of the plurality of sensors plus the electromagnetic wave projector.

Figure 11:
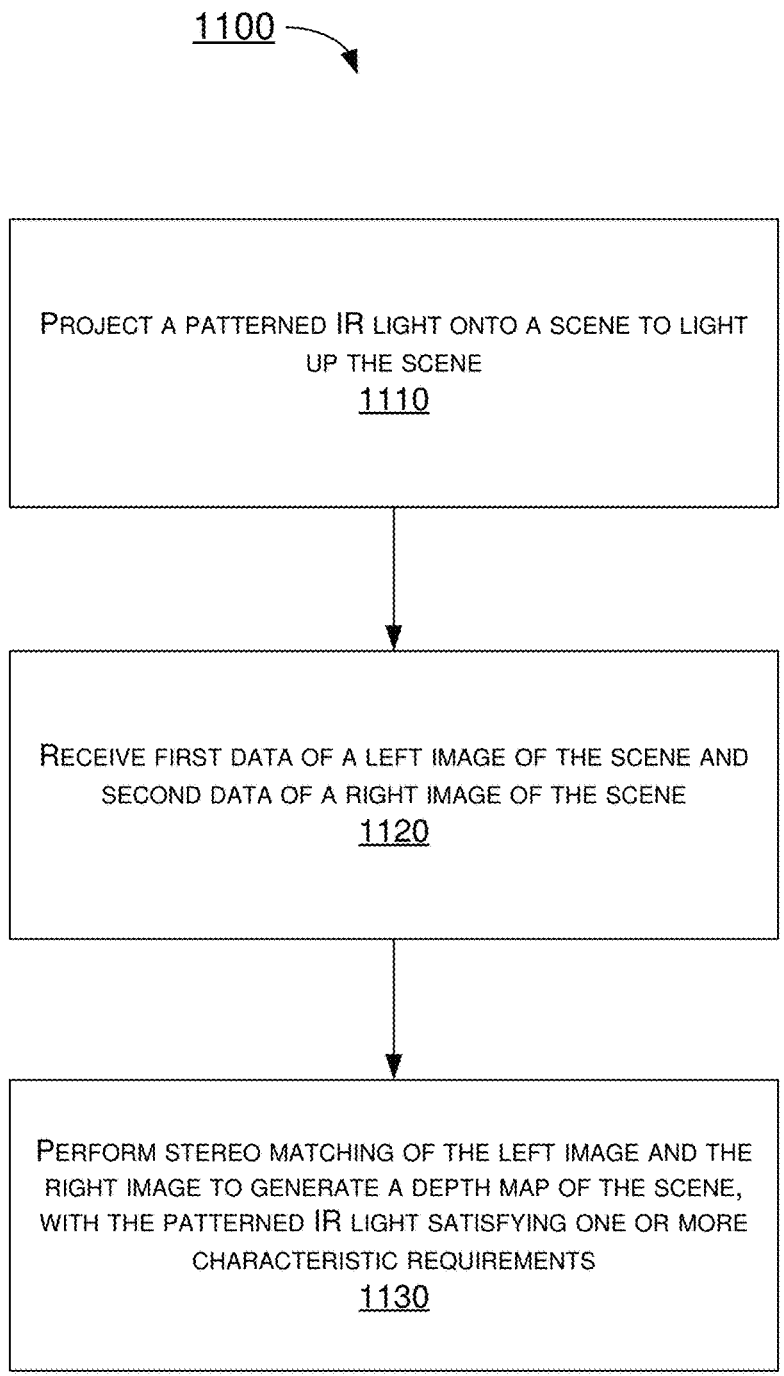
FIG. 11 is a flowchart of an example process in accordance with an implementation of the present disclosure.

FIG. 11 illustrates an example process 1100 in accordance with an implementation of the present disclosure. Process 1100 may be an example implementation of the various procedures, scenarios, schemes, solutions, concepts and techniques, or a combination thereof, whether partially or completely, with respect to IR pattern characteristics for active stereo matching in accordance with the present disclosure. Process 1100 may represent an aspect of implementation of features of apparatus 900. Process 1100 may include one or more operations, actions, or functions as illustrated by one or more of blocks 1110, 1120 and 1130. Although illustrated as discrete blocks, various blocks of process 1100 may be divided into additional blocks, combined into fewer blocks, or eliminated, depending on the desired implementation. Moreover, the blocks of process 1100 may executed in the order shown in FIG. 11 or, alternatively, in a different order. Furthermore, one or more of the blocks of process 1100 may be repeated one or more times. Process 1100 may be implemented by apparatus 900 or any variation thereof. Solely for illustrative purposes and without limitation, process 1100 is described below in the context of apparatus 900. Process 1100 may begin at block 1110.

At 1110, process 1100 may involve control circuit 910 controlling an electromagnetic wave projector 930 (e.g., IR projector) to project a structured IR light onto a scene to light up the scene. Process 1100 may proceed from 1110 to 1120.

At 1120, process 1100 may involve control circuit 910 receiving first data of a left image of the scene from a first camera (e.g., sensor 920(1)) and second data of a right image of the scene from a second camera (e.g., sensor 920(2)). Process 1100 may proceed from 1120 to 1130.

At 1130, process 1100 may involve control circuit 910 performing stereo matching (e.g., active stereo matching) of the left image and the right image to generate a depth map of the scene. The structured IR light may satisfy one or more characteristic requirements.

In some implementations, a pattern of the structured IR light may include a plurality of IR pixels formed in a shape of one or more dots, one or more lines, one or more circles, one or more ovals, one or more polygons, one or more stars, or a combination thereof.

In some implementations, a pattern of the structured IR light may include a plurality of pixels with a density satisfying a density requirement such that a number of IR pixels divided by a total number of pixels in a predefined window within the left image or the right image is greater than or equal to a first threshold.

In some implementations, the first threshold may be 0.2.

In some implementations, the structured IR light may include a plurality of instances of a repeated pattern. In such cases, a period of repetition of the repeated pattern along a search direction of the stereo matching may be greater than an operating range of the stereo matching.

In some implementations, a direction of repetition of the repeated pattern may be rotated with respect to the search direction of the stereo matching by an angle with an absolute value greater than 0° and less than 90°.

In some implementations, an ambiguity value of each pixel or each patch of pixels within a search range along a direction of stereo matching may be less than or equal to a second threshold.

In some implementations, in performing the stereo matching of the left image and the right image, process 1100 may involve control circuit 910 calculating the ambiguity value using a cost function of a cost value of a difference between the left image and the right image. In some implementations, the cost function may be expressed mathematically as follows:

$$\text{Cost}_{absolute\ difference}(PL,d) = \frac{1}{3} * \Sigma_{i=R,G,B} |I_i^{left}(P_L) - I_i^{right}(P_R)|,$$

Here, $I_i^{left}(P_L)$ may denote a luminance of a current pixel within a patch in the left image, and $I_i^{right}(P_R)$ may denote a luminance of the current pixel within a reference patch in the right image during the stereo matching.

In some implementations, in calculating the ambiguity value using the cost function, process 1100 may involve control circuit 910 calculating the ambiguity value by dividing a smallest cost value from the cost function by a second smallest cost value from the cost function.

In some implementations, the second threshold may be 0.8.

In some implementations, in performing the stereo matching of the left image and the right image, process 1100 may involve control circuit 910 performing active stereo matching of the left image and the right image.

Figure 12:
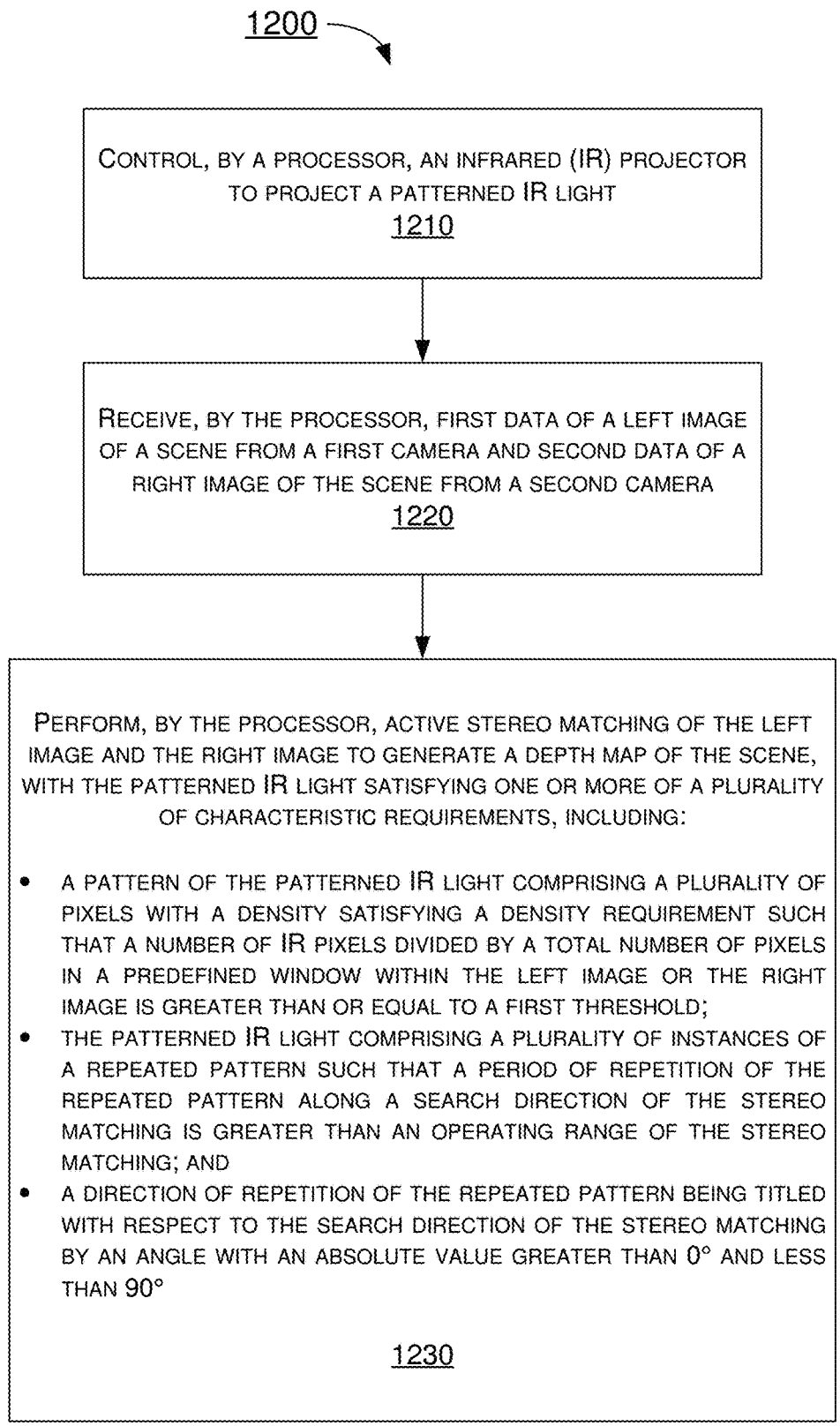
FIG. 12 is a flowchart of an example process in accordance with an implementation of the present disclosure.

FIG. 12 illustrates an example process 1200 in accordance with an implementation of the present disclosure. Process 1200 may be an example implementation of the various procedures, scenarios, schemes, solutions, concepts and techniques, or a combination thereof, whether partially or completely, with respect to IR pattern characteristics for active stereo matching in accordance with the present disclosure. Process 1200 may represent an aspect of implementation of features of apparatus 900. Process 1200 may include one or more operations, actions, or functions as illustrated by one or more of blocks 1210, 1220 and 1230. Although illustrated as discrete blocks, various blocks of process 1200 may be divided into additional blocks, combined into fewer blocks, or eliminated, depending on the desired implementation. Moreover, the blocks of process 1200 may executed in the order shown in FIG. 12 or, alternatively, in a different order. Furthermore, one or more of the blocks of process 1200 may be repeated one or more times. Process 1200 may be implemented by apparatus 900 or any variation thereof. Solely for illustrative purposes and without limitation, process 1200 is described below in the context of apparatus 900. Process 1200 may begin at block 1210.

At 1210, process 1200 may involve control circuit 910 controlling an electromagnetic wave projector 930 (e.g., IR projector) to project a structured IR light. Process 1200 may proceed from 1210 to 1220.

At 1220, process 1200 may involve control circuit 910 receiving first data of a left image of a scene from a first camera (e.g., sensor 920(1)) and second data of a right image of the scene from a second camera (e.g., sensor 920(2)). Process 1200 may proceed from 1220 to 1230.

At 1230, process 1200 may involve control circuit 910 performing active stereo matching of the left image and the right image to generate a depth map of the scene. The structured IR light may satisfy one or more of a plurality of characteristic requirements.

In some implementations, the plurality of characteristic requirements may include: (1) a pattern of the structured IR light comprising a plurality of pixels with a density satisfying a density requirement such that a number of IR pixels divided by a total number of pixels in a predefined window within the left image or the right image is greater than or equal to a first threshold; (2) the structured IR light comprising a plurality of instances of a repeated pattern such that a period of repetition of the repeated pattern along a search direction of the stereo matching is greater than an operating range of the stereo matching; and (3) a direction of repetition of the repeated pattern being rotated with respect to the search direction of the stereo matching by an angle with an absolute value greater than 0° and less than 90°.

In some implementations, a pattern of the structured IR light may include a plurality of IR pixels formed in a shape of one or more dots, one or more lines, one or more circles, one or more ovals, one or more polygons, one or more stars, or a combination thereof.

In some implementations, an ambiguity value of each pixel or each patch of pixels within a search range along a direction of stereo matching may be less than or equal to a second threshold.

In some implementations, in performing the stereo matching of the left image and the right image, process 1200 may involve control circuit 910 calculating the ambiguity value using a cost function of a cost value of a difference between the left image and the right image. In some implementations, the cost function may be expressed mathematically as follows:

$$\text{Cost}_{absolute\ difference}(PL,d) = \frac{1}{3} * \Sigma_{i=R,G,B} |I_i^{left}(P_L) - I_i^{right}(P_R)|,$$

Here, $I_i^{left}(P_L)$ may denote a luminance of a current pixel within a patch in the left image, and $I_i^{right}(P_R)$ may denote a luminance of the current pixel within a reference patch in the right image during the stereo matching. Moreover, the first threshold may be 0.2, and the second threshold may be 0.8.

In some implementations, in calculating the ambiguity value using the cost function, process 1200 may involve control circuit 910 calculating the ambiguity value by dividing a smallest cost value from the cost function by a second smallest cost value from the cost function.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving first data of a left image of a scene and second data of a right image of the scene; and
performing stereo matching of the left image and the right image to generate a depth map of the scene,
wherein a patterned infrared (IR) light is projected onto the scene to light up the scene, and
wherein the patterned IR light satisfies one or more characteristic requirements,
wherein an ambiguity value of each pixel or each patch of pixels within a search range along a direction of stereo matching is less than or equal to a second threshold,
wherein the performing of the stereo matching of the left image and the right image comprises calculating the ambiguity value using a cost function of a cost value of a difference between the left image and the right image,
wherein the cost function is expressed mathematically as:

$$\text{Cost}_{absolute\ difference}(PL,d)=\frac{1}{3}*\Sigma_{i=R,G,B}|I_i^{left}(P_L)-I_i^{right}(P_R)|,$$

wherein $I_i^{left}(P_L)$ denotes a luminance of a current pixel within a patch in the left image,
wherein i $I_i^{right}(P_R)$ denotes a luminance of the current pixel within a reference patch during the stereo matching, and
wherein the calculating of the ambiguity value using the cost function comprises calculating the ambiguity value by dividing a smallest cost value from the cost function by a second smallest cost value from the cost function.

2. The method of claim 1, wherein a pattern of the patterned IR light comprises a plurality of IR pixels formed in a shape of one or more dots, one or more lines, one or more circles, one or more ovals, one or more polygons, one or more stars, or a combination thereof.

3. The method of claim 1, wherein a pattern of the patterned IR light comprises a plurality of pixels with a density satisfying a density requirement such that a number of IR pixels divided by a total number of pixels in a predefined window within the left image or the right image is greater than or equal to a first threshold.

4. The method of claim 3, wherein the first threshold is 0.2.

5. The method of claim 1, wherein the patterned IR light comprises a plurality of instances of a repeated pattern, and wherein a period of repetition of the repeated pattern along a search direction of the stereo matching is greater than an operating range of the stereo matching.

6. The method of claim 5, wherein a direction of repetition of the repeated pattern is rotated with respect to the search direction of the stereo matching by an angle with an absolute value greater than 0° and less than 90°.

7. The method of claim 1, wherein the second threshold is 0.8.

8. The method of claim 1, wherein the performing of the stereo matching of the left image and the right image comprises performing active stereo matching of the left image and the right image.

9. A method, comprising:
controlling an infrared (IR) projector to project a patterned IR light;
receiving first data of a left image of a scene from a first camera and second data of a right image of the scene from a second camera; and
performing active stereo matching of the left image and the right image to generate a depth map of the scene,
wherein the patterned IR light satisfies one or more of a plurality of characteristic requirements, and
wherein the plurality of characteristic requirements comprise:
a pattern of the patterned IR light comprising a plurality of pixels with a density satisfying a density requirement such that a number of IR pixels divided by a total number of pixels in a predefined window within the left image or the right image is greater than or equal to a first threshold;
the patterned IR light comprising a plurality of instances of a repeated pattern such that a period of repetition of the repeated pattern along a search direction of the stereo matching is greater than an operating range of the stereo matching; and
a direction of repetition of the repeated pattern being rotated with respect to the search direction of the stereo matching by an angle with an absolute value greater than 0° and less than 90°,
wherein an ambiguity value of each pixel or each patch of pixels within a search range along a direction of stereo matching is less than or equal to a second threshold,
wherein the performing of the stereo matching of the left image and the right image comprises calculating the ambiguity value using a cost function of a cost value of a difference between the left image and the right image,
wherein the cost function is expressed mathematically as:

$$\text{Cost}_{absolute\ difference}(PL,d)=\frac{1}{3}*\Sigma_{i=R,G,B}|I_i^{left}(P_L)-I_i^{right}(P_R)|,$$

wherein $I_i^{left}(P_L)$ denotes a luminance of a current pixel within a patch in the left image,
wherein i $I_i^{right}(P_R)$ denotes a luminance of the current pixel within a reference patch during the stereo matching,
wherein the first threshold is 0.2,
wherein the second threshold is 0.8, and
wherein the calculating of the ambiguity value using the cost function comprises calculating the ambiguity value by dividing a smallest cost value from the cost function by a second smallest cost value from the cost function.

10. The method of claim 9, wherein a pattern of the patterned IR light comprises a plurality of IR pixels formed in a shape of one or more dots, one or more lines, one or more circles, one or more ovals, one or more polygons, one or more stars, or a combination thereof.

11. An apparatus, comprising:
a control circuit which, during operation, performs operations comprising:
controlling an infrared (IR) projector to project a patterned IR light;
receiving first data of a left image of a scene from a first camera and second data of a right image of the scene from a second camera; and
performing active stereo matching of the left image and the right image to generate a depth map of the scene,
wherein the patterned IR light satisfies one or more characteristic requirements,
wherein the patterned IR light satisfies one or more additional characteristic requirements of a plurality of characteristic requirements comprising:
a pattern of the patterned IR light comprising a plurality of pixels with a density satisfying a density requirement such that a number of IR pixels divided by a total number of pixels in a predefined window within the left image or the right image is greater than or equal to a first threshold;
the patterned IR light comprising a plurality of instances of a repeated pattern such that a period of repetition of the repeated pattern along a search direction of the stereo matching is greater than an operating range of the stereo matching; and
a direction of repetition of the repeated pattern being rotated with respect to the search direction of the stereo matching by an angle with an absolute value greater than 0° and less than 90°,
wherein an ambiguity value of each pixel or each patch of pixels within a search range along a direction of stereo matching is less than or equal to a second threshold,
wherein, in performing the active stereo matching of the left image and the right image, the control circuit calculates the ambiguity value using a cost function of a cost value of a difference between the left image and the right image,
wherein the cost function is expressed mathematically as:

$$\text{Cost}_{absolute\ difference}(PL,d)=\frac{1}{3}*\Sigma_{i=R,G,B}|I_i^{left}(P_L)-I_i^{right}(P_R)|,$$

wherein $I_i^{left}(P_L)$ denotes a luminance of a current pixel within a patch in the left image,
wherein i $I_i^{right}(P_R)$ denotes a luminance of the current pixel within a reference patch during the stereo matching,
wherein the first threshold is 0.2,
wherein the second threshold is 0.8, and
wherein, in calculating the ambiguity value using the cost function, the control circuit calculates the ambiguity value by dividing a smallest cost value from the cost function by a second smallest cost value from the cost function.

* * * * *